Sept. 5, 1961 R. F. KILLEY ET AL 2,999,083
POLYMERIZATION OF UNSATURATED HYDROCARBONS
Filed Nov. 28, 1958
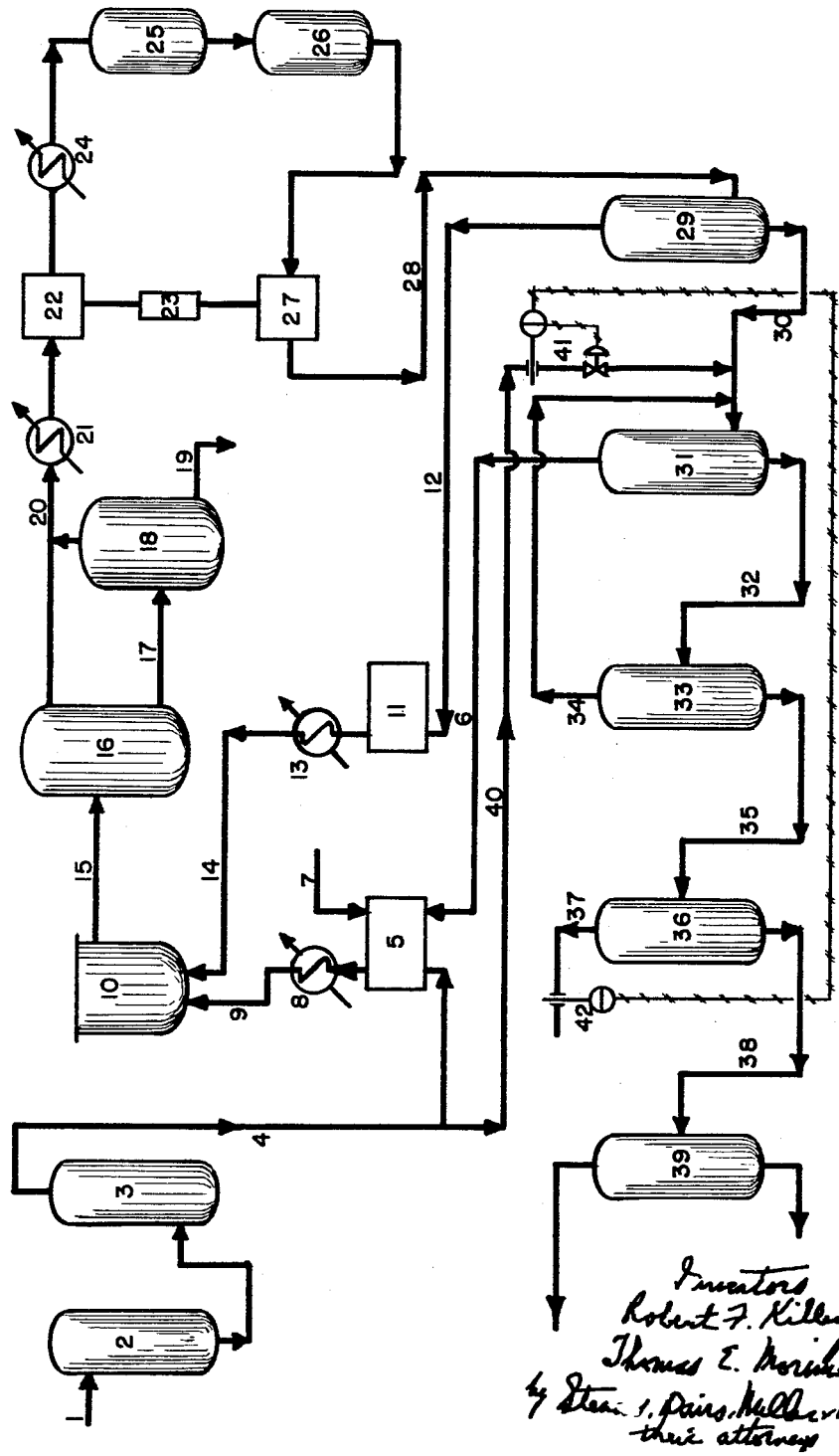

United States Patent Office 2,999,083
Patented Sept. 5, 1961

2,999,083
POLYMERIZATION OF UNSATURATED HYDROCARBONS
Robert F. Killey, Sarnia, Ontario, Canada, and Thomas E. Morimoto, Calgary, Alberta, Canada, assignors to Polymer Corporation Limited, Sarnia, Ontario, Canada, a body corporate
Filed Nov. 28, 1958, Ser. No. 776,942
10 Claims. (Cl. 260—85.3)

This invention relates generally to the field of low temperature polymerizations. It relates more particularly to the Friedel-Crafts catalyzed copolymerization of an isoolefine with a diolefine and relates especially to the low temperature copolymerization of isobutylene with isoprene to produce rubbery elastic vulcanizable copolymers and to the recovery and reuse of the unreacted liquid components of the copolymerization reaction system.

It is known that a series of valuable copolymers may be produced by polymerization of mixtures of isobutylene with copolymerizable monomers such as vinyl aromatic compounds and diolefinic hydrocarbons. The preferred copolymerizable monomers are the conjugated diolefines having from 4 to 14 carbon atoms per molecule, especially butadiene-1,3 and 2-methyl butadiene-1,3, more commonly known as isoprene. The usual procedure involves the steps of cooling a mixture of a major proportion of isobutylene with a minor proportion of isoprene, usually in the presence of a volatile non-reactive diluent such as methyl chloride, to a temperature between $+40°$ C. and $-164°$ C., preferably between $-60°$ C. and $-120°$ C., then copolymerizing the cold mixture in a reactor by the application or addition of a dissolved Friedel-Crafts catalyst such as aluminum chloride. In the manufacture of the so-called butyl rubbers methyl chloride is usually present in amounts varying between about 70–80% by weight of the total feed to the reactor, while the isobutylene concentration varies from about 20–30% and the concentration of isoprene between about 0.25–5.0%. The resulting polymers, when cured, have good strength and excellent physical properties—particularly imperviousness to air and resistance to attack by ozone. They have found wide use in such applications as air retaining liners for automobile tires, wire coverings, etc.

The polymerization reaction may be conducted continuously or in a succession of separate batches, there being little choice between the two with respect to the quality of the polymer produced, although continuous operation does offer certain practical advantages.

In carrying out either a continuous or batch process employing conventional Friedel-Crafts polymerization catalysts it is normally desirable that high purity components be used, the isoolefine desirably being of at least 98% purity and the diolefine desirably of at least 95% purity, and preferably higher. When polymerizing isobutylene with isoprene the presence of small amounts of saturates such as butane and propane is probably immaterial but the presence of propylene, butylene-1 or butylene-2, pentylenes and certain other interfering impurities is undesirable. Normal butylenes are present in appreciable concentrations in isobutylene streams and interfere most in the polymerization reaction. It is desirable, therefore, to keep their concentration in the system as low as possible.

In commercial operations both low molecular weight liquid and high molecular weight solid polymers may be obtained. The polymerization reaction is usually stopped short of 100% conversion of monomer to polymer, with the conversion range normally being about 50 to 95%. Economic considerations require that in addition to the polymer the corresponding 50 to 5% remaining unreacted monomers as well as the volatile reaction diluent be recovered for reuse. Conventionally, this is accomplished by contacting the reaction mixture with hot water to vaporize the volatile diluent and monomers, thus separating them from the polymer, collecting these flashed vapors and compressing and drying them and separating them into their component parts by fractional distillation.

In large scale operations involving the above-described process it is customary to employ a number of reactors so connected that, for instance, two out of three can be used for actual polymerization while one reactor is being cleaned. Intermittent cleaning is required as there is always a certain amount of fouling which takes place during the polymerization step. As a result of the alternation in the cycles of the reactor, particularly at the time of shutting off of one reactor or in starting another reactor and especially in case two reactors are shut down at the same time, there are substantial fluctuations in the volume of the flashed vapors of unreacted reactants and volatile diluent which flow to the fractionation system. A second factor influencing the volume of flow to the fractionation system is the conversion level to which the polymerization reaction is being carried. Some types of polymers are reacted to higher conversions than other types. The higher the conversion in any particular reaction, the lower is the volume of flashed, compressed and dried reactant vapours, normally mainly isoolefine, which are fed to the distillation towers comprising the fractionation system. Experience shows that the volume of flow of compressed vapours which are normally fed to the fractionation system may often fluctuate as much as $\pm 25\%$ from the average. Thus, an undesirable variation is encountered in the course of distillation which, in turn, affects the purity of the hydrocarbon fractions which are recovered and reused. The presence of small quantities of impurities in these fractions, particularly the presence of normal-butylenes in the fractions obtained in recovery systems associated with the polymerization of isobutylene with isoprene in the presence of methyl chloride reaction diluent, has been found to have a disproportionately high influence not only on catalyst efficiency but also on reaction rate and the quality of the polymers produced by the reaction.

An object of the present invention is to provide an improved method for recovering and recycling volatile reaction diluent and unreacted monomer in a process for the Friedel-Crafts catalyzed polymerization of isoolefines.

Another object of this invention is to provide a method for reducing the concentration of close-boiling normal-olefines present in hydrocarbon streams recovered from the reaction products of and subsequent to the Friedel-Crafts catalyzed polymerizations of isoolefines.

Another object of the present invention is to provide a method for reducing the concentration of normal-butylenes in streams comprising isobutylene and methyl chloride recovered from the reaction products of and subsequent to the Friedel-Crafts catalyzed polymerizations of the isobutylene.

Another object is to provide a means for obtaining a more stable operation of the recycle fractionation system.

Another object is to provide a method for preparing polymers having reduced fouling characteristics. This results in increased production since the intervals between reactor shut-downs for cleaning purposes are lengthened.

These and other objects are attained in the process for preparing isoolefine-containing polymers wherein the reactants, while dispersed in a non-reactive non-complex-forming volatile diluent, are contacted with a Friedel-Crafts catalyst in a reaction zone maintained at a temperature between $+40°$ C. and $-164°$ C. to effect incomplete conversion into polymers thereof; and wherein the unreacted reactants and volatile diluent are recovered and fed to a fractionation system comprising a series of distillation towers to effect their separation into various fractions; and wherein the distillate from the first tower comprising a high purity fraction of the volatile diluent is recovered for reuse in the polymerization reaction; and wherein the undistilled fraction obtained from the bottom of the first distillation tower is subjected to further distillation in a second tower from which most of the remaining portion of the volatile diluent, along with appreciable quantities of the isoolefine and close-boiling normal-olefines usually associated with the isoolefine, is distilled and recovered for reuse in the polymerization reaction; and wherein the bottoms fraction from said second tower containing the remainder of the volatile diluent, isoolefine, close-boiling normal-olefines and other reactant is subjected to further recovery treatment; by the step which comprises maintaining at least a predetermined minimum quantity of isoolefine in the feed to the second distillation tower by the addition thereto of such further quantities of the isoolefine as are required. The desired quantities of the isoolefine of suitable purity may be added directly from a supply source such as a storage tank or other container. When preparing butyl rubbers from isobutylene and isoprene it is normal practice to distill the isobutylene immediately prior to use. A preferred form of this invention, therefore, involves the diversion of part of the distilled isobutylene to the fractionation system to maintain the isobutylene concentration in the feed to the second tower at the desired level.

The advantages and details of the present invention will be better understood by reference to the accompanying drawing which illustrates the preferred form of the invention. Apparatus such as valves, pumps, some heat exchange equipment and other auxiliary lines and equipment have been omitted from the drawing for the purpose of simplification. Referring more particularly to this drawing it is seen that there are provided a feed line 1, a drying tower 2 and a distillation tower 3 whereby fresh isobutylene feed is dried and distilled prior to entry into the system. The distilled isobutylene is led through line 4 into the feed make-up area represented by 5 where it is mixed with a recycled mixed stream of methyl chloride and isobutylene entering the area via line 6 and isoprene entering via line 7. The mixed feed then passes through chillers 8 to reactor 10 via line 9 where it is catalytically polymerized by contact with aluminum chloride catalyst solution. The catalyst solution is prepared in catalyst makeup area 11 where methyl chloride, entering the area via line 12, is brought into contact with anhydrous aluminum chloride to form the solution. After being adjusted to the desired strength it is cooled by passage through catalyst chillers 13 prior to its entry into reactor 10 via line 14. The slurry of polymer in methyl chloride obtained in reactor 10, mixed with the unreacted monomers, is led via line 15 into flash tank 16 where it is contacted with steam and hot water to vaporize the methyl chloride diluent along with the unreacted monomers and thus form a slurry of polymer in water. This slurry is sent via line 17 to vacuum stripper 18 where any remaining methyl chloride and monomers are flashed off overhead while the water slurry of raw polymer is sent to the raw polymer finishing area through line 19. The flashed gases from flash tank 16 and vacuum stripper 18 are combined in line 20 and passed in sequence through cooler 21, the low pressure side 22 of compressor 23, cooler 24 and knock out drum 25 to effect removal of most of the entrained water. The remaining water in the hydrocarbon gases is then removed in drier 26 prior to further compression by passage through the high pressure side 27 of compressor 23. The recycle hydrocarbon stream is now a liquid and is ready for entry into the recycle fractionation system for separation into its various fractions. The entry is made via line 28 at tower 29, the methyl chloride distillation tower, where the application of heat permits the taking off as an overhead product of a small stream of purified methyl chloride containing only trace amounts of other components. This methyl chloride stream is recycled via line 12 to the catalyst make-up area 11 where it is reused as solvent for the aluminum chloride catalyst. The bottoms from tower 29 are sent to recycle distillation tower 31 via line 30. Further heating in this tower results in an overhead product, comprised mainly of methyl chloride along with small amounts of isobutylene and normal-butylenes, which is recycled via line 6 to feed make-up area 5 for further use. The bottoms from tower 31 are fed to methyl chloride recovery tower 33 via line 32 where all the remaining methyl chloride plus smaller amounts of isobutylene and normal-butylenes are removed overhead and recirculated via line 34 to line 30 for further recovery as part of the feed to recycle distillation tower 31. The bottoms from tower 33 are sent to isobutylene purge tower 36 through line 35. Essentially all of the remaining isobutylene and normal-butylenes are obtained overhead from this tower via line 37 with the bottoms being comprised of the unreacted portion of the isoprene which was originally fed to the reactor. This isoprene may be further purified by distillation in tower 39 where it is sent by line 38 or it may be recovered as such from the bottom of tower 36.

From the foregoing description of the process it is now seen that the operation of tower 31 is very important from the standpoint of reactor behaviour since it is here that a large fraction of the undesirable normal-butylenes may be removed from the system as undistilled bottoms. We have found that the most desirable operation of tower 31 is dependent not only on the maintenance of an adequate volume of feed to the tower but also on the maintenance of at least a minimum concentration of the reactant monomers in the feed. When higher conversion types of polymers are being produced in the reactor, most of the isobutylene is depleted from the system by polymerization to form the polymer. This will result in an inadequate supply of isobutylene being present in the feed to tower 31. This, in turn, will prevent the maintenance of the required purge of isobutylene from the bottom of this tower. A continuous purge of isobutylene is necessary for best operation of tower 31 and for the most complete removal of the undesirable normal-butylene components in the bottoms along with the isobutylene. For the purpose of this invention a portion of the distilled isobutylene is taken from the overhead of isobutylene distillation tower 3 and fed through lines 4 and 40 into feed line 30 to make up any deficiency in the isobutylene concentration in the feed to tower 31. One suitable method for automatically controlling the rate at which isobutylene is fed through line 40 is indicated in the drawing. Flow recording controller valve 41 positioned in addition line 40 is actuated by the overhead flow rates obtained from tower 36 as picked up by flow recording controller 42. When the system flow is less than a predetermined desired minimum, controller 42 will initiate the flow of isobutylene and adjust the volume of flow to the level required to maintain stability in the operation of tower 31, and when the system flow is greater than the predetermined minimum, controller 42 will keep isobutylene addition shut off. It is obvious that satisfactory results may also be obtained if the added isobutylene enters the system as part of the feed to tower 29 or at a point earlier in the system.

It is to be recognized that the predetermined minimum level for the quantity of isobutylene which must be maintained in the feed to recycle distillation tower 31 cannot be fixed absolutely, since its value is dependent on the capacity of the tower. This value, however, will be easily determined for each set of conditions by simple experimentation. Generally, it can be stated that it is desirable that a minimum of about 80 pounds of isobutylene per hour per square foot of tower area be fed to tower 31 and preferably at least 120 pounds of isobutylene per hour per square foot of tower area.

Operations carried out outside the scope of the present invention, i.e. when deficiencies in isobutylene concentration in the feed to tower 31 were not made up by the addition of further quantities of this monomer, have shown that it is not unusual to find from 5 to 10 weight percent, based on the total $C_4$ content, of normal-butylenes present in the overhead product from tower 31 during the production of 90% conversion polymers. Similar operations carried out subsequent to the installation of line 6 and controllers 41 and 42, i.e. within the scope of the present invention, have shown a reduction in normal-butylene concentration to an average of less than 2.5 weight percent with no values higher than 3.0 weight percent being encountered.

*Example*

A run of 90% conversion polymer of isobutylene and isoprene was carried out in a commercial scale operation of the system illustrated in the accompanying drawing, at —98° C. using methyl chloride diluent and aluminum chloride catalyst. 15,000 lbs./hour of feed were charged to each of two reactors operating simultaneously. The approximate composition of the reactor feed stream was 74.5 weight percent methyl chloride diluent, 24.9 weight percent isobutylene, 0.28 weight percent isoprene and 0.07 weight percent normal-butylenes. This run was carried out without the addition of further quantities of isobutylene to the feed stream going into tower 31. It was found that towers 31, 33 and 36 could not be operated satisfactorily in a continuous manner because of the lack of sufficient quantities of isobutylene in the feed to tower 31. Towers 33 and 36 were placed on total reflux until enough $C_4$ hydrocarbons and isoprene had built up in tower 31 to permit removal of a bottoms fraction. Some of this material was then sent to towers 33 and 36 to be processed, following which the towers were again placed on total reflux and the above cycle was repeated. This method of operation was unsatisfactory in that it allowed normal-butylenes to be "boiled overhead" in tower 31. Analysis of the overhead stream after several days' operation indicated the presence of 260 pounds of normal-butylenes, 4340 pounds of isobutylene, and 95,400 pounds of methyl chloride per 100,000 pounds of total overhead product. The addition of isobutylene to feed line 30 through line 40 was then started. The addition was made at the rate of 3,500 pounds of isobutylene per 100,000 pounds of bottoms effluent from tower 29. This permitted towers 33 and 36 to be operated continuously. Analysis of the overhead stream from tower 31 after several days' operation indicated the presence of 55 pounds of normal-butylenes, 2770 pounds of isobutylene, and 97,175 pounds of methyl chloride per 100,000 pounds of total overhead product. In these runs tower 39 was not used since the bottoms from tower 36 was recovered as such. Thus it is seen that the addition of isobutylene to the feed to tower 31 effected a threefold reduction in the ratio of normal-butylenes to isobutylenes in the overhead product and a fivefold reduction in the quantity of normal-butylenes which were returned to the reactor in this product. This reduction in the quantity of normal-butylenes recycled to the reactor resulted in approximately a 5% increase in polymer production.

While the invention has been described and illustrated specifically with respect to the copolymerization of isobutylene with isoprene in the preparation of the well-known butyl rubbers, it is not desired that its applicability be interpreted as being restricted solely to this system since it is obvious that the invention may be applied successfully to the polymerization of other monomers, i.e. isoolefines in general and particularly those containing from 4 to 8 carbon atoms when polymerized with the preferred $C_4$ to $C_{14}$ conjugated diolefines. For example, the teaching of this invention may be applied with beneficial effects to the recycle recovery system of the Friedel-Crafts catalyzed polymerization of 2-methyl pentylene-1 with hexadiene-2,4 in the presence of a volatile non-reactive diluent.

We claim:

1. In the process for preparing copolymers of isobutylene with multiolefinic hydrocarbon compounds containing 4–14 carbon atoms per molecule wherein a major proportion of isobutylene and a minor proportion of the multiolefinic hydrocarbon compound, while dispersed in a non-reactive non-complex-forming volatile diluent which is a non-solvent for the copolymers, are contacted with a Friedel-Crafts catalyst in a reaction zone maintained at a temperature between +40° C. and —164° C., to effect incomplete conversion into copolymers thereof; and wherein the unreacted isobutylene and multiolefinic hydrocarbon compound and volatile diluent are recovered and fed to a fractionation system comprising a series of distillation towers to effect their separation into various fractions; and wherein the distillate from the first tower comprising a high purity fraction of the volatile diluent is recovered for reuse in the polymerization reaction; and wherein the undistilled fraction obtained from the bottom of the first tower is subjected to further distillation in a second tower from which most of the remaining portion of the volatile diluent, along with appreciable quantities of the isobutylene and close-boiling normal-butylenes usually associated with the isobutylene, is distilled and recovered for reuse in the polymerization reaction; and wherein the bottoms fraction from said second tower, containing the remainder of the volatile diluent, isobutylene, close-boiling normal-butylenes and the multiolefinic hydrocarbon compound is subjected to further recovery treatment; the step which comprises maintaining in the feed to the second distillation tower a minimum of 80 pounds of isobutylene per hour per square foot of tower area.

2. The process of claim 1 wherein the multiolefinic hydrocarbon compound is isoprene.

3. The process of claim 2 wherein the minimum quantity of 80 pounds of isobutylene per hour per square foot of tower area is maintained in the feed to the second distillation tower by the addition of isobutylene, to the mixture of flashed unreacted isobutylene and isoprene and volatile diluent prior to the entry of such mixture into the first distillation tower.

4. The process of claim 3 wherein the non-reactive non-complex-forming volatile diluent is methyl chloride and the Friedel-Crafts catalyst is aluminum chloride.

5. The process of claim 2 wherein the isobutylene monomer reactant is distilled prior to being copolymerized with the isoprene and wherein the desired predetermined minimum quantity of 80 pounds of isobutylene per hour per square foot of tower area is maintained in the feed to the second distillation tower by the addition of a portion of the distilled isobutylene to such feed.

6. The process of claim 5 wherein the non-reactive non-complex-forming volatile diluent is methyl chloride and the Friedel-Crafts catalyst is aluminum chloride.

7. The process of claim 2 wherein the isobutylene monomer reactant is distilled prior to being copolymerized with the isoprene and wherein the desired predetermined minimum quantity of 80 pounds of isobutylene per hour per square foot of tower area is maintained in the feed to the second distillation tower by the addition of a portion of the distilled isobutylene to the feed to the first distillation tower.

8. The process of claim 7 wherein the non-reactive non-complex-forming volatile diluent is methyl chloride and the Friedel-Crafts catalyst is aluminum chloride.

9. The process of claim 2 wherein the non-reactive non-complex-forming volatile diluent is methyl chloride and the Friedel-Crafts catalyst is aluminum chloride.

10. In the process for preparing copolymers of isobutylene and isoprene wherein a hydrocarbon stream comprised mainly of isobutylene is distilled in an isobutylene distillation tower to obtain a higher purity stream of isobutylene; and wherein 20–30 parts by weight of the distilled isobutylene is mixed with 0.25–5.0 parts by weight of said isoprene while dispersed in 70–80 parts by weight of methyl chloride diluent, and contacted with a solution of aluminum trichloride catalyst in methyl chloride in a polymerization reaction zone maintained at a temperature between $+40°$ C. and $-164°$ C., to effect incomplete conversion of the reactants into copolymers thereof; and wherein the reaction zone effluent comprising a mixture of said copolymers with the unreacted portion of said reactants and methyl chloride diluent is treated to separate the unreacted reactants and methyl chloride diluent from the copolymers; and wherein the separated unreacted reactants and methyl chloride diluent are fed to a fractionation system comprising a series of distillation towers to effect their separation into various fractions; and wherein the distillate from the first tower comprising a high purity fraction of the methyl chloride is recovered for reuse in preparing fresh catalyst solution; and wherein the bottoms fraction from the first tower is sent to a second tower where most of the remaining portion of the methyl chloride diluent along with appreciable quantities of the isobutylene and close-boiling normal-butylenes usually associated with the isobutylene, are distilled and recovered for reuse in the polymerization reaction; and wherein the bottoms fraction from said second tower, containing the remainder of the methyl chloride diluent, isobutylene, normal-butylenes and isoprene is sent to a third tower where substantially all the remaining methyl chloride diluent plus small amounts of isobutylene and normal-butylenes are removed overhead and recycled to the second tower for further recovery; and wherein the bottoms fraction from said third tower, containing isobutylene, normal-butylenes and isoprene, is sent to a fourth tower where essentially all of the remaining isobutylene and normal-butylenes are removed as an overhead product stream; and wherein the bottoms fraction from said fourth tower is comprised of the unreacted portion of the isoprene along with higher boiling hydrocarbons; the step which comprises using means operated by the volume of flow of the overhead product stream from the fourth tower to automatically divert varying amounts of the distilled isobutylene obtained from the isobutylene distillation tower to the feed to the second tower to maintain a minimum of 80 pounds of isobutylene per hour per square foot of tower area in the feed to said second tower.

References Cited in the file of this patent

UNITED STATES PATENTS

| | | |
|---|---|---|
| 2,844,569 | Green et al. | July 22, 1958 |

FOREIGN PATENTS

| | | |
|---|---|---|
| 485,956 | Canada | Aug. 19, 1952 |
| 770,265 | Great Britain | Mar. 20, 1957 |